US012798753B2

(12) United States Patent
Durand et al.

(10) Patent No.: US 12,798,753 B2
(45) Date of Patent: Nov. 17, 2026

(54) AIRCRAFT COMPRISING AT LEAST ONE REMOVABLE DEVICE FOR ABSORBING ENERGY BY COMPRESSION

(71) Applicant: Airbus Operations (S.A.S.), Toulouse (FR)

(72) Inventors: Jérôme Durand, Toulouse (FR); Marc Vandersteen, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 18/976,689

(22) Filed: Dec. 11, 2024

(65) Prior Publication Data

US 2025/0196989 A1 Jun. 19, 2025

(30) Foreign Application Priority Data

Dec. 14, 2023 (FR) ...................................... 2314132

(51) Int. Cl.
*B64C 1/06* (2006.01)
*B64C 1/26* (2006.01)
*B64D 37/04* (2006.01)

(52) U.S. Cl.
CPC .............. *B64C 1/062* (2013.01); *B64D 37/04* (2013.01); *B64C 1/26* (2013.01)

(58) Field of Classification Search
CPC ...................................................... B64C 1/062
See application file for complete search history.

(56) References Cited

U.S. PATENT DOCUMENTS 4,593,870 A * 6/1986 Cronkhite ............... B64C 1/062 244/119
5,542,626 A * 8/1996 Beuck ..................... B64C 1/062 244/119
9,163,369 B2 * 10/2015 James ................... E01F 15/086
9,637,212 B2 5/2017 Cottet
10,704,638 B2 * 7/2020 Tyan ....................... B32B 5/245

(Continued)

FOREIGN PATENT DOCUMENTS

EP 1426289 A1 6/2004
EP 1930237 A1 6/2008

(Continued)

OTHER PUBLICATIONS

Du et al., "Multi-cell energy-absorbing structures with hollow columns inspired by the beetle elytra," Journal of Materials Science, vol. 55, No. 10: 4279-4291 (Jan. 2020)—Abstract.

(Continued)

*Primary Examiner* — Joshua D Huson
*Assistant Examiner* — Anna L. Gordon
(74) *Attorney, Agent, or Firm* — KDW Firm PLLC

(57) ABSTRACT

An aircraft including first and second elements spaced apart from one another and at least one device for absorbing energy by compression, positioned between the first and second elements, including at least one module for absorbing energy by compression and at least one attachment system removably connecting each module for absorbing energy by compression to at least one of the first and second elements, at least one module for absorbing energy by compression including several first conduits oriented in a compression direction and being independent of the first and second elements.

20 Claims, 19 Drawing Sheets

(56) References Cited

U.S. PATENT DOCUMENTS

| | | | | |
|---|---|---|---|---|
| 2005/0001093 | A1* | 1/2005 | Hayashi .................. | F16F 7/124<br>244/17.17 |
| 2007/0102239 | A1 | 5/2007 | Liguore | |
| 2007/0114331 | A1* | 5/2007 | Poggi ...................... | B64C 1/062<br>244/117 R |
| 2009/0184200 | A1 | 7/2009 | Lin | |
| 2009/0206202 | A1* | 8/2009 | Bolukbasi ............... | B64C 1/062<br>244/121 |
| 2012/0187717 | A1* | 7/2012 | Tanaka ...................... | F16F 7/12<br>296/187.03 |
| 2018/0100621 | A1 | 4/2018 | Tyan | |

FOREIGN PATENT DOCUMENTS

| | | | | | |
|---|---|---|---|---|---|
| EP | 2505490 | A1 | | 10/2012 | |
| EP | 3129220 | B1 | | 9/2020 | |
| EP | 4574648 | A1 | * | 6/2025 | ............... B64C 1/18 |
| GB | 2555862 | A | | 5/2018 | |

OTHER PUBLICATIONS

Jiang et al., "Numerical, theoretical, and experimental studies on the energy absorption of the thin-walled structures with bio-inspired constituent element," International Journal of Mechanical Sciences, vol. 164: 105173 (Sep. 2019)—Abstract.

Notice of Allowance in U.S. Appl. No. 18/976,639 dated Jun. 27, 2025, 8 pages.

* cited by examiner

AIRCRAFT COMPRISING AT LEAST ONE REMOVABLE DEVICE FOR ABSORBING ENERGY BY COMPRESSION

TECHNICAL FIELD

The subject matter herein relates to an aircraft comprising at least one removable device for absorbing energy by compression.

BACKGROUND

According to an embodiment, a panel comprises first and second skins and a honeycomb structure, interposed between the first and second skins, which comprises a plurality of conduits oriented perpendicularly to the first and second skins. This honeycomb structure has a honeycomb geometry and comprises a plurality of identical, juxtaposed conduits of hexagonal section. Generally, the conduits are of small section, which gives the panel high compression strength (forces perpendicular to the skins). Such panels are not used as modules for absorbing energy by compression.

According to an embodiment described in document U.S. Pat. No. 9,637,212, an aircraft comprises a module for absorbing energy by compression positioned between the skin of the fuselage and a fairing. This module comprises a honeycomb structure comprising a plurality of conduits oriented parallel to the skin of the fuselage and to the fairing. This honeycomb structure has a honeycomb geometry and comprises a plurality of identical, juxtaposed conduits of hexagonal section oriented in a direction perpendicular to a deformation direction. This embodiment does not absorb a large amount of energy. According to the embodiment described in the document U.S. Pat. No. 9,637,212, the fairing is used to absorb energy and has shapes that fit the honeycomb structure in order to immobilize it, which increases the weight of the aircraft and therefore the consumption thereof.

According to another embodiment, an aircraft may comprise a belly fairing designed to absorb energy in the event of an impact. Even if in this case the belly fairing is not used to absorb energy, the addition of this function makes it more complex.

Patent EP1426289 discloses a device for absorbing energy by compression that does not comprise an attachment system removably connecting each module for absorbing energy by compression to at least one of the first and second elements.

SUMMARY

The disclosure herein is intended to overcome some or all of the drawbacks in the prior art.

For this purpose, the disclosure herein relates to an aircraft comprising first and second elements spaced apart from one another and at least one device for absorbing energy by compression positioned between the first and second elements and designed to be subjected to compressive forces oriented in a compression direction, the device including at least one module for absorbing energy by compression which comprises several first conduits oriented in the compression direction.

According to the disclosure herein, the module for absorbing energy by compression is independent of the first and second elements. In addition, the device for absorbing energy by compression comprises at least one attachment system removably connecting each module for absorbing energy by compression to at least one of the first and second elements.

This solution limits the impact of the device for absorbing energy by compression on the elements that it separates.

According to another feature, each module for absorbing energy by compression is connected to just one of the first and second elements.

According to another feature, the first element being offset upwards from the second element, each module for absorbing energy by compression is suspended below the first element.

According to another feature, each module for absorbing energy by compression is spaced apart from the first and second elements.

According to another feature, each attachment system comprises a first flange pressed against the first or second element and connected to the latter by at least one first connection element, a second flange pressed against the module for absorbing energy by compression and connected to the latter by at least one second connection element and a web connecting the first and second flanges to form a single and unique Z-shaped part, at least one of the first and second connection elements being removable.

According to another feature, the aircraft comprises a fuselage, at least one tank, a belly fairing spaced apart from the tank, and at least one device for absorbing energy by compression interposed between the tank and the belly fairing and positioned below the tank.

According to another feature, each module for absorbing energy by compression is connected only to the fuselage and/or to the tank.

According to another feature, the device for absorbing energy by compression comprises several modules for absorbing energy by compression positioned symmetrically with respect to the vertical longitudinal plane of symmetry of the aircraft.

According to another feature, the first conduits are spaced apart from one another. In addition, each module for absorbing energy by compression comprises junction walls, parallel to the compression direction, connecting these first conduits so as to delimit at least one second conduit with the latter.

According to another feature, the junction walls are oriented in two or three directions so as to obtain an orthogrid or isogrid network.

According to another feature of the disclosure herein, each module for absorbing energy by compression comprises at least one first end wall designed to close the first end of at least one first conduit and at least one second end wall designed to close the second end of at least one first conduit. According to another feature, the first end wall is designed to leave the second conduit at least partially open. According to another feature, the second end wall is designed to leave the second conduit at least partially open. According to another feature, the first end wall and the second end wall are each designed to leave the second conduit at least partially open.

According to another feature of the disclosure herein, the aircraft comprises a device for absorbing energy by compression comprising at least two modules for absorbing energy by compression, of which at least one of the modules for absorbing energy by compression comprises at least one junction wall in common with another module for absorbing energy by compression.

BRIEF DESCRIPTION OF THE DRAWINGS

Other features and advantages are set out in the description of the disclosure herein below, given purely by way of example and with reference to the attached drawings, in which.

DETAILED DESCRIPTION

Figure 1:
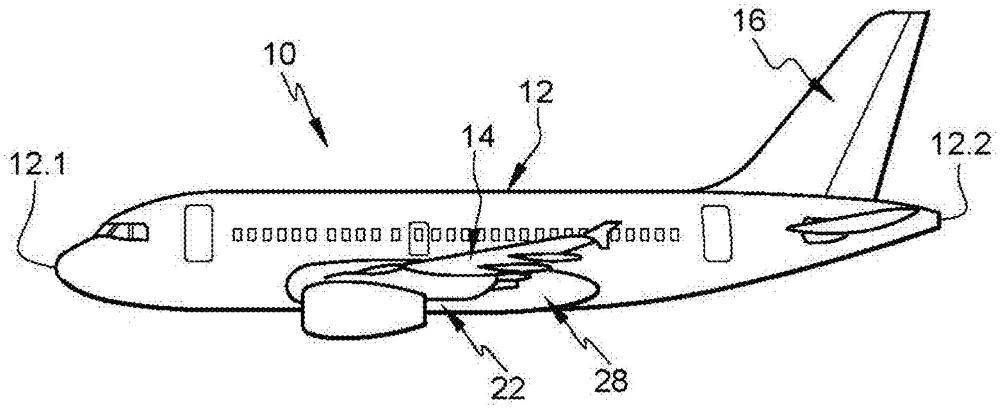
FIG. 1 is a side view of an aircraft.
Figure 2:
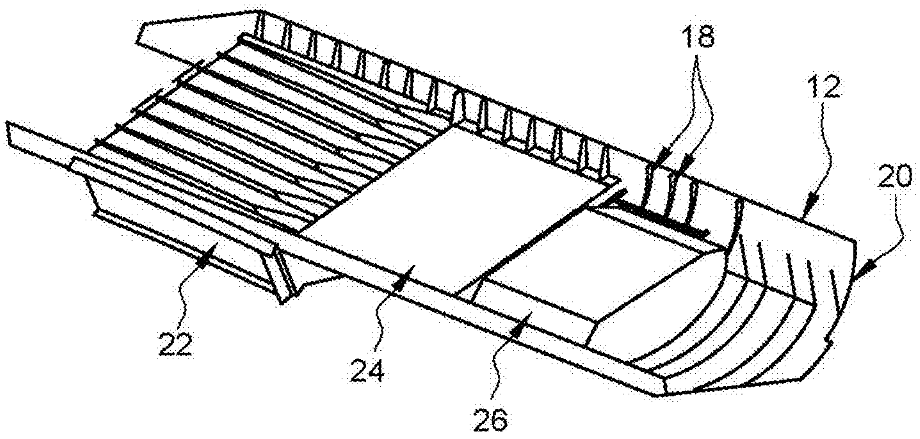
FIG. 2 is a perspective view of a lower part of an aircraft illustrating an embodiment of the disclosure herein.
Figure 3:
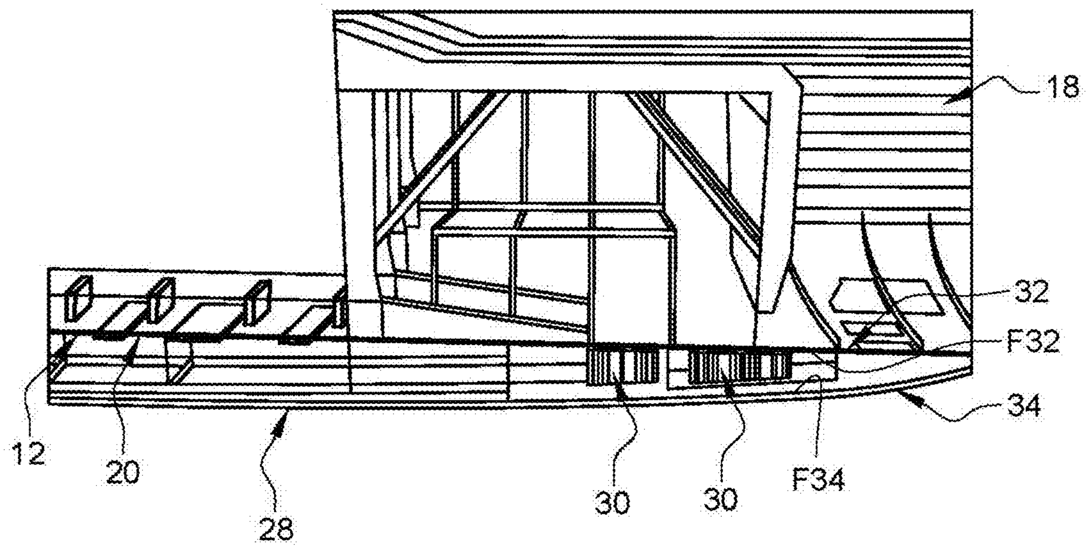
FIG. 3 is a longitudinal cross section of a lower part of an aircraft fuselage including modules for absorbing energy by compression in the undeformed state illustrating an embodiment of the disclosure herein.

For the remainder of the description, a longitudinal direction is a direction parallel to a longitudinal axis, which is substantially horizontal when the aircraft is on the ground, and which extends from the nose cone 12.1 to the tail cone 12.2. The aircraft 10 has a vertical longitudinal plane of symmetry containing the longitudinal axis.

The fuselage 12 also comprises a primary structure 18 composed of frames and stringers as well as a skin 20 attached to the primary structure 18. It also comprises a central wing box 22 and a landing gear bay 24 offset rearwards with respect to the central wing box 22. According to one configuration, the fuselage 12 comprises at least one tank 26 offset rearwards with respect to the landing gear bay 24.

The aircraft 10 comprises a belly fairing 28 which extends below the central wing box 22, the landing gear bay 24 and the tank 26, and has a width substantially equal to the width of the fuselage 12. At least in line with the tank 26, the belly fairing 28 and the fuselage 12 (more particularly the skin 20 of the fuselage 12) are spaced apart. According to one configuration, the tank 26 is a structural tank partially integrated into the structure of the fuselage 12.

The aircraft 10 comprises at least one device for absorbing energy by compression, interposed between the belly fairing 28 and the fuselage 12 (more particularly the skin 20 of the fuselage 12), which includes at least one module 30 for absorbing energy by compression interposed between the belly fairing 28 and the fuselage 12 (more particularly the skin 20 of the fuselage 12). According to one configuration, the aircraft 10 comprises at least one module 30 for absorbing energy by compression interposed between the belly fairing 28 and the tank 26, positioned below the latter. This configuration makes it possible to add an additional tank 26 to the rear of the landing gear bay 24, the tank 26 being protected by at least one module 30 for absorbing energy by compression in the event of a vertical impact on the belly fairing 28.

Figure 4:
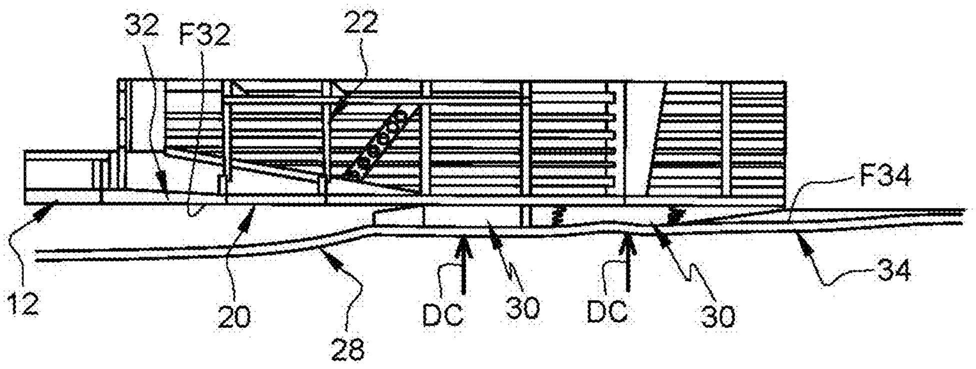
FIG. 4 is a longitudinal cross section of a lower part of an aircraft fuselage including modules for absorbing energy by compression in the deformed state illustrating an embodiment of the disclosure herein.

Of course, the disclosure herein is not limited to this arrangement. Thus, the device for absorbing energy by compression could be positioned at another location on the aircraft. More generally, the device for absorbing energy by compression is designed to be positioned between first and second elements 32, 34 that are spaced apart, more precisely between first and second contact surfaces F32, F34 that are spaced apart, and to be subjected to compressive forces oriented in a compression direction DC (visible in FIG. 4) intersecting with the first and second elements 32, 34. According to a first arrangement, the first and second contact surfaces F32, F34 are substantially parallel to each other and substantially perpendicular to the compression direction DC. According to another arrangement, the first and second contact surfaces F32, F34 are not parallel to each other, and one of them is perpendicular to the compression direction DC. The first element 32 is selected from a structure, a fuselage, a fairing, or a tank of the aircraft; the second element 34 being different from the first element 32 and spaced apart from the latter and selected from a structure, a fuselage, a fairing, or a tank of the aircraft.

Each module 30 for absorbing energy by compression comprises several first conduits 36 spaced apart from one another, oriented in the compression direction DC and each having a first cross section (perpendicular to the compression direction DC) and junction walls 38 parallel to the compression direction DC and connecting first conduits 36 so as to delimit, with the latter, at least one second conduit 40 which has a second cross section (perpendicular to the compression direction DC).

Each first conduit 36 has a side wall 42 and extends between first and second ends 42.1, 42.2 oriented towards the first and second elements 32, 34 respectively.

Figure 11:
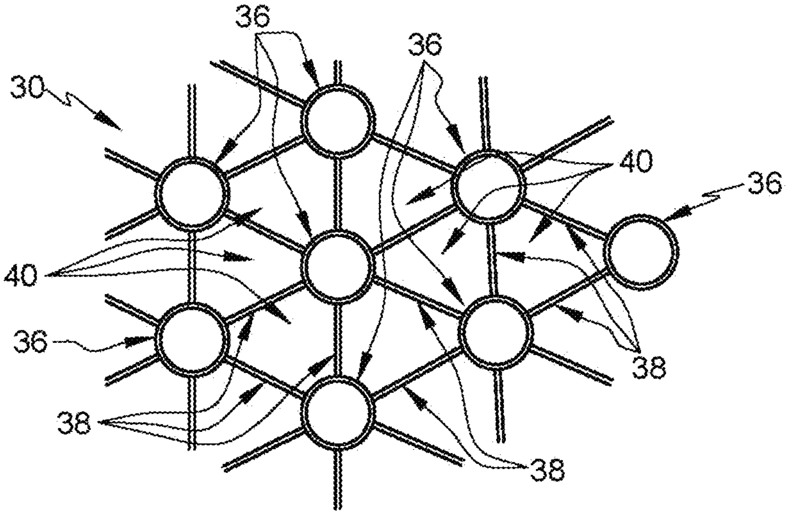
FIG. 11 is a top view of a module for absorbing energy by compression illustrating an embodiment of the disclosure herein.

According to an embodiment visible in FIG. 11, the first conduits 36 of a given module 30 for absorbing energy by compression all have the same cross section.

Figure 9:
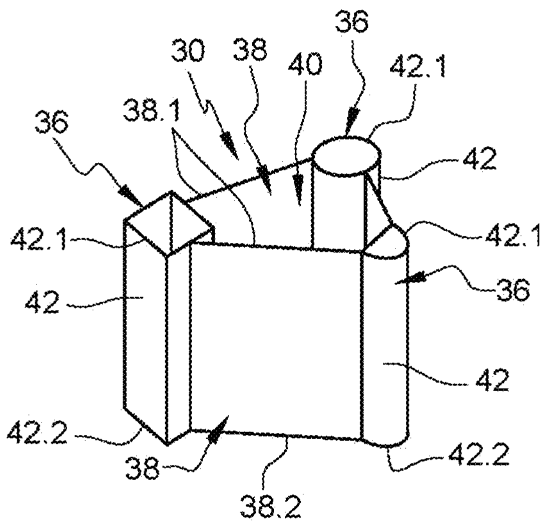
FIG. 9 is a perspective view of a module for absorbing energy by compression illustrating an embodiment of the disclosure herein.

According to an embodiment visible in FIG. 9, the first conduits 36 of a given module 30 for absorbing energy by compression have different cross sections.

According to the various embodiments, the first cross sections of the first conduits 36 may be prismatic, square, rectangular, triangular, circular or semi-circular. Of course, the disclosure herein is not limited to these geometries for the first cross sections of the first conduits 36.

According to an embodiment visible in FIGS. 5 to 8 and 15 to 19, a module 30 for absorbing energy by compression comprises first conduits 36 having first circular or semi-circular cross sections of substantially the same diameter.

The first conduits 36 have for example a first cross section of between 20 and 200 $cm^2$.

Figure 10:
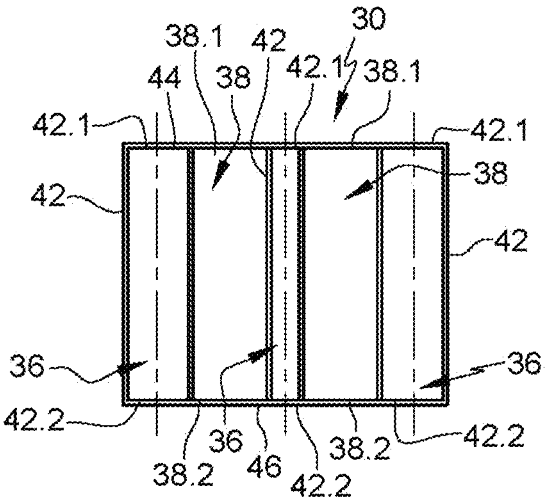
FIG. 10 is a side view of a module for absorbing energy by compression illustrating an embodiment of the disclosure herein.

According to embodiments visible in particular in FIGS. 9 and 10, each junction wall 38 is substantially rectangular and extends between first and second edges 38.1, 38.2 oriented towards the first and second elements 32, 34 respectively, and between third and fourth edges 38.1, 38.2 connected to first conduits 36.

Depending on the configurations, the junction walls 38 are planar. Some junction walls 38 may be non-planar and may have at least one hollow form to at least partially accommodate a first conduit 36 of another module 30 for absorbing energy by compression.

Figure 5:
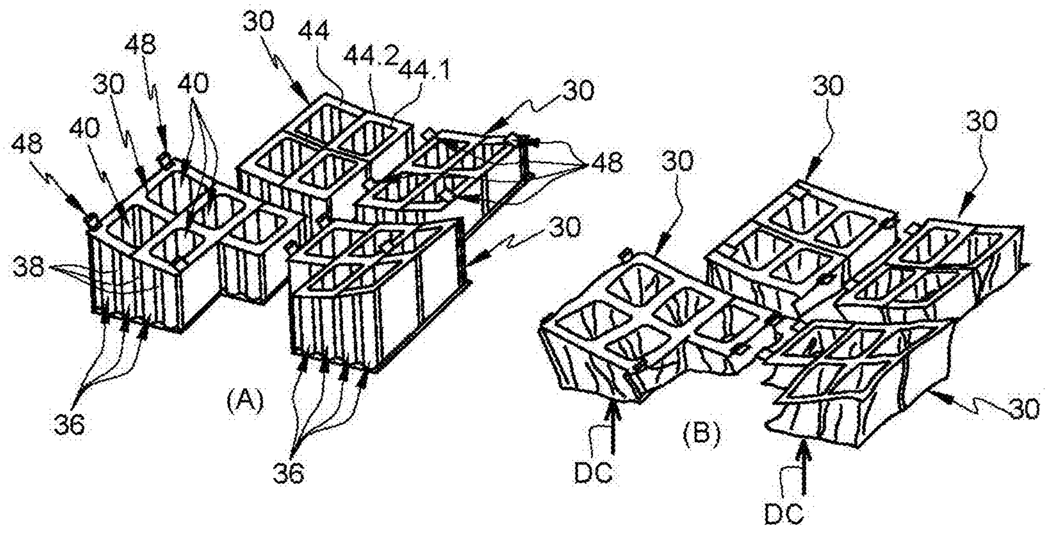
FIG. 5 is a perspective view of modules for absorbing energy by compression illustrating an embodiment of the disclosure herein, in the undeformed state in part (A) and in the deformed state in part (B)
Figure 6:
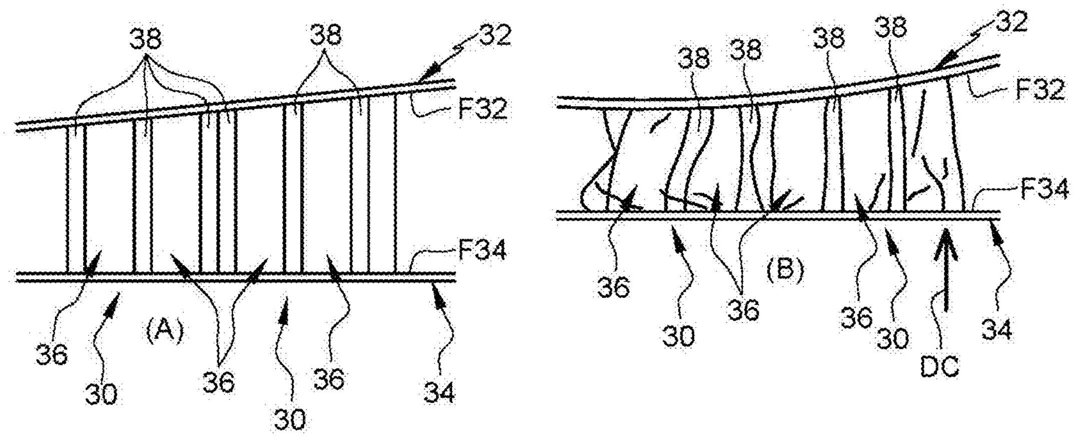
FIG. 6 is a side view of two modules for absorbing energy by compression illustrating an embodiment of the disclosure herein, in the undeformed state in part (A) and in the deformed state in part (B)
Figure 7:
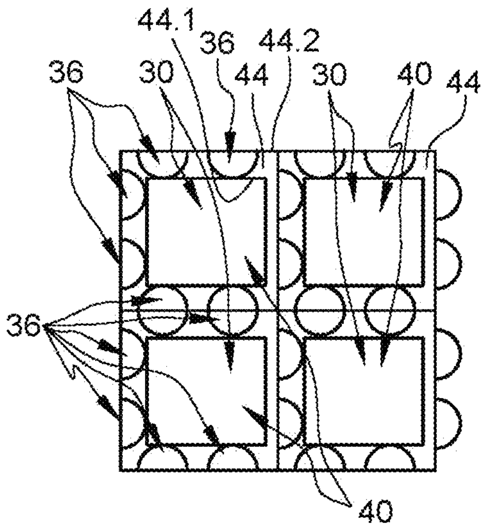
FIG. 7 is a top view of modules for absorbing energy by compression illustrating an embodiment of the disclosure herein.
Figure 8:
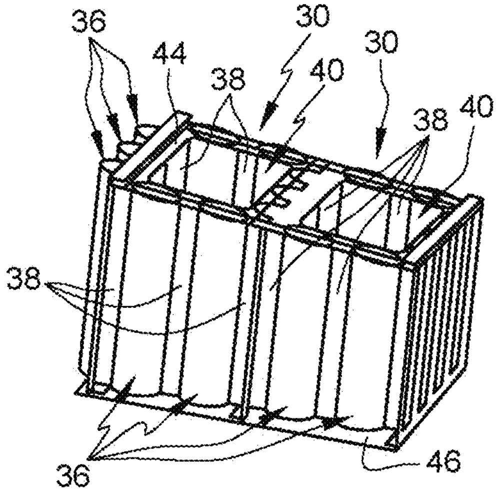
FIG. 8 is a perspective view of modules for absorbing energy by compression illustrating an embodiment of the disclosure herein.

According to an embodiment, the junction walls 38 of the modules 30 for absorbing energy by compression are oriented in two or three directions so as to obtain an orthogrid junction-wall network, as illustrated in FIGS. 5, 7, 8, 12 and 15 to 19, or an isogrid junction-wall network, as illustrated in FIG. 6. This solution results in a crushing of the first conduits 36, which ensures an absorption of energy, instead of a buckling of the first conduits 36.

According to one arrangement, the junction walls 38 form an orthogrid network and are oriented in a first direction parallel to the longitudinal direction and in a second direction perpendicular to the longitudinal direction.

Figure 19:
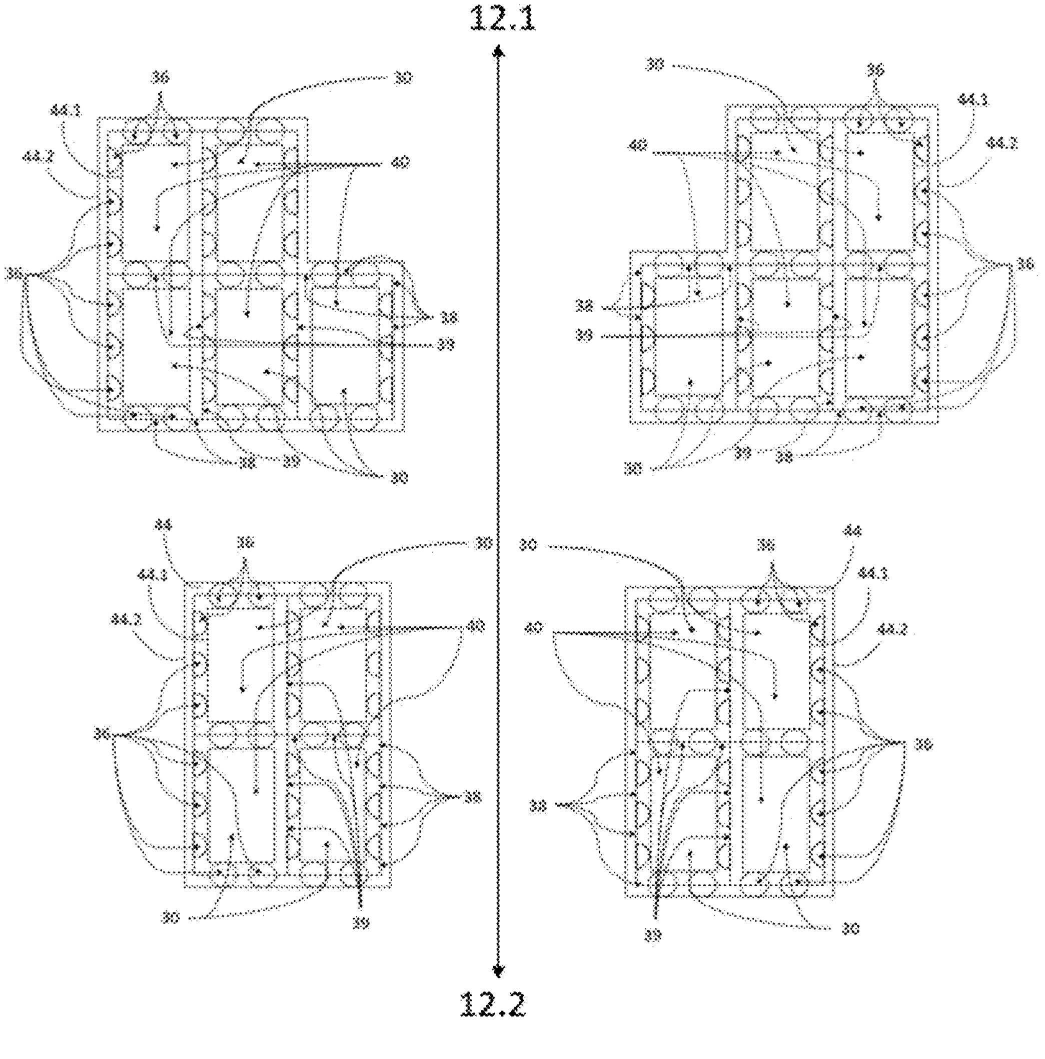
FIG. 19 is a top view of several devices for absorbing energy by compression designed to be positioned between first and second elements (32, 34) of an aircraft. According to an embodiment visible in FIG. 1, an aircraft 10 comprises a fuselage 12 that extends from a nose cone 12.1 to a tail cone 12.2, wings 14 positioned on both sides of the fuselage 12, and a tail unit 16 positioned at the tail cone 12.2 of the fuselage 12.

According to a configuration shown in FIG. 19, the device for absorbing energy by compression comprises several modules 30 for absorbing energy by compression positioned symmetrically with respect to the vertical longitudinal plane of symmetry of the aircraft.

The first ends 42.1 of the first conduits 36 and the first edges 38.1 of the junction walls 38 of a given module 30 for absorbing energy by compression are positioned in one and the same first plane or the same first near-planar surface.

In addition, the second ends 42.2 of the first conduits 36 and the second edges 38.2 of the junction walls 38 of a given module 30 for absorbing energy by compression are positioned in one and the same second plane or the same second near-planar surface.

The junction walls 38 are connected to the first conduits 36 by any appropriate means, such as welding, for example. In a variant, the junction walls 38 and the first conduits 36 of a module 30 for absorbing energy by compression are made in one piece by an additive manufacturing process, for example.

According to an embodiment, the junction walls 38 and the first conduits 36 of a module 30 for absorbing energy by compression are made of aluminum alloy, in particular from sheets of aluminum alloy.

For each second conduit 40, the second cross section thereof corresponds to a zone delimited by the junction walls 38 and a part of the side walls 42 of the first conduits 36 and does not comprise the first cross sections of the first conduits 36 bordering it.

According to an embodiment of the disclosure herein, for each module 30 for absorbing energy by compression, the second cross section of the second conduit 40 is greater than that of the first conduits 36. According to one configuration, the second cross section of the second conduit 40 is at least twice as large as the first cross section of each first conduit 36 bordering the second conduit 40. Such a module for absorbing energy by compression allows a greater amount of energy to be absorbed.

According to one configuration, the second cross section of the second conduit 40 is greater than the sum of the first cross sections of the first conduits 36 bordering the second conduit 40 and less than 10 times the sum of the first cross sections of the first conduits 36 bordering the second conduit 40.

According to one configuration, the junction walls 38 and first conduits 36 of a given module 30 for absorbing energy by compression are arranged so that the second conduit 40 has a prismatic, square, rectangular, triangular, or circular cross section. Of course, the disclosure herein is not limited to these geometries for the cross sections of the second conduit 40.

According to an embodiment, the module 30 for absorbing energy by compression comprises at least one second conduit 40. According to another embodiment, the module 30 for absorbing energy by compression comprises several second conduits 40. According to one arrangement, the second conduits 40 of a given module 30 for absorbing energy by compression are all identical, as illustrated in FIG. 11.

According to the arrangements visible in FIGS. 9 and 11, the module 30 for absorbing energy by compression comprises at least one second conduit 40 having a second triangular cross section, the first conduits 36 being positioned at the vertices of the cross section of each second conduit 40.

According to another arrangement visible in FIGS. 5 to 8 and 15 to 19, the module 30 for absorbing energy by compression comprises at least one second conduit 40 having a second cross section bordered by first conduits 36 that are positioned away from the vertices of the cross section of each second conduit 40.

According to the arrangement visible in FIGS. 5 to 8 and 15 to 19, the module 30 for absorbing energy by compression comprises at least one second conduit 40 which has a second cross section bordered by cylindrical and/or semi-cylindrical first conduits 36. In an embodiment, the first conduits 36 are positioned on the sides of the second cross section and away from the vertices of this second cross section. More particularly, the module 30 for absorbing energy by compression comprises, on the sides of the second conduit 40, two or three first cylindrical and/or semi-cylindrical conduits 36. In a more particular embodiment, the module 30 for absorbing energy by compression comprises at least one second conduit 40 having a second square or rectangular cross section.

According to another embodiment, visible in FIGS. 5 to 8 and 15 to 19, the module 30 for absorbing energy by compression comprises, on the sides of the second conduit 40, two or three first cylindrical and/or semi-cylindrical conduits 36.

The second conduit 40 has a second cross section of between 200 and 2000 $cm^2$.

The dimensions and the material(s) of the first conduits 36 and of the junction walls 38 are determined so as to ensure a progressive crushing of the first conduits 36, encouraging the absorption of energy instead of a buckling of the conduits.

According to an embodiment, the module 30 for absorbing energy by compression comprises at least one first end wall 44 designed to close the first end 42.1 of at least one first conduit 36 and at least one second end wall 46 designed to close the second end 42.2 of at least one first conduit 36.

According to another feature, the first end wall 44 is designed to leave the second conduit 40 at least partially open. According to another feature, the second end wall 46 is designed to leave the second conduit 40 at least partially open.

According to an embodiment, the module 30 for absorbing energy by compression comprises at least one first end wall 44 designed to close the first end 42.1 of at least one first conduit 36 and to leave the second conduit 40 at least partially open, and at least one second end wall 46 designed to close the second end 42.2 of at least one first conduit 36 and to leave the second conduit 40 at least partially open. According to one arrangement, the module 30 for absorbing energy by compression comprises one or more first end walls 44 closing the first end 42.1 of all the first conduits 36 and leaving the second conduit 40 at least partially open, and one or more second end walls 46 closing the second end 42.2 of all the first conduits 36 and leaving the second conduit 40 at least partially open.

According to one configuration, a first end wall 44 is designed to close the first ends 42.1 of several first conduits 36 of the module 30 for absorbing energy by compression. A second end wall 46 is designed to close the second ends 42.2 of several conduits 36 of the module 30 for absorbing energy by compression.

According to one arrangement, the first end wall 44 is designed to close the first ends 42.1 of all the first conduits 36 of the module 30 for absorbing energy by compression. This first end wall 44 forms a frame delimited by an inner edge 44.1 and an outer edge 44.2 spaced apart from the inner edge 44.1 by a distance sufficient to close the first conduits 36 of the module 30 for absorbing energy by compression. The second end wall 46 is designed to close the second ends 42.2 of all the first conduits 36 of the module 30 for absorbing energy by compression. This second end wall 46 forms a frame delimited by an inner edge and an outer edge spaced apart from the inner edge by a distance sufficient to close the first conduits 36 of the module 30 for absorbing energy by compression.

Of course, the disclosure herein is not limited to this number and to this geometry for the first and second end walls 44, 46. Thus, each of the first and second end walls 44, 46 may be formed by a single wall or by several juxtaposed walls.

According to an embodiment, the first and second end walls 44, 46 form part of the module 30 for absorbing energy by compression and are connected to the first conduits 36 and to the junction walls 38 by any appropriate means, such as welding, for example. Of course, the disclosure herein is not limited to this embodiment. Thus, at least one of the first and second end walls 44, 46 could not form part of the module 30 for absorbing energy by compression and be integral with the first or second element 32, 34 between which the module 30 for absorbing energy by compression is positioned.

Figure 12:
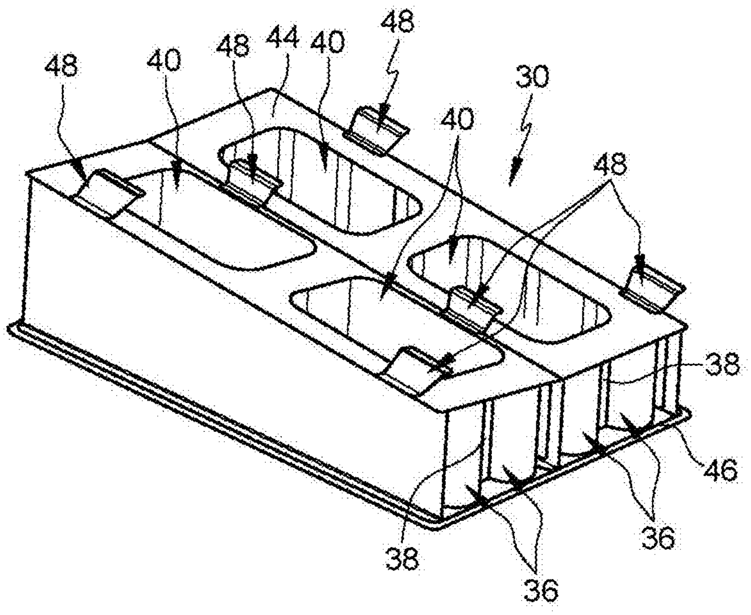
FIG. 12 is a perspective view of a module for absorbing energy by compression illustrating an embodiment of the disclosure herein.
Figure 13:
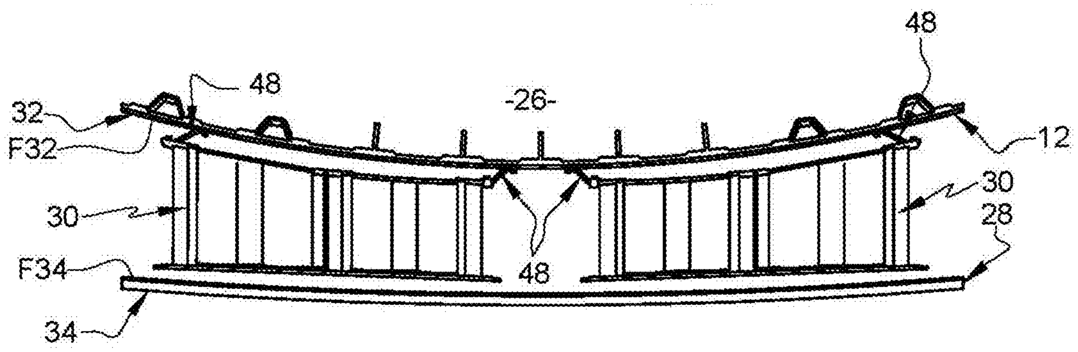
FIG. 13 is a cross section of a part of an aircraft comprising several modules for absorbing energy by compression suspended below a tank, illustrating an embodiment of the disclosure herein.

According to an embodiment visible in FIGS. 5, 12 and 13, the device for absorbing energy by compression comprises at least one attachment system 48 removably connecting each module 30 for absorbing energy by compression to at least one of the first and second elements 32, 34 between which the module 30 for absorbing energy by compression is positioned. This attachment system 48 is designed to allow rapid assembly or disassembly of the module 30 for absorbing energy by compression.

According to an embodiment visible in FIGS. 15 to 18, the device for absorbing energy by compression comprises at least two modules 30 for absorbing energy by compression, of which at least one module for absorbing energy by compression comprises at least one junction wall 39 in common with another module 30 for absorbing energy by compression.

According to an embodiment, one of the junction walls 38 of the device for absorbing energy by compression comprises at least one system for fastening to at least one first end wall 44 and to at least one second end wall 46. More particularly, the common junction wall 39 comprises at least one system for fastening to at least one first end wall 44 and to at least one second end wall 46. Still more particularly, at least one of the junction walls 38 parallel to the common wall 39 comprises fasteners to at least one first end wall 44 and to at least one second end wall 46.

According to another embodiment, one of the junction walls 38 of the module for absorbing energy by compression comprises at least one system for fastening to at least one first end wall 44 and to at least one second end wall 46.

In the case of an aircraft, each module 30 for absorbing energy by compression comprises several attachment systems 48 for connecting it to the fuselage 12 (more particularly to the skin 20 of the fuselage 12) and/or to the belly fairing 28. According to one configuration, each module 30 for absorbing energy by compression is connected to just one of the first and second elements 32, 34. According to one arrangement, the first element 32 being offset upwards with respect to the second element 34, each module for absorbing energy by compression is suspended below the first element 32, specifically the fuselage 12 or the tank 26.

According to one arrangement, each module 30 for absorbing energy by compression is connected only to the fuselage 12 and/or to the tank 26 and is not connected to the belly fairing 28. According to this arrangement, each module 30 for absorbing energy by compression is suspended below the fuselage 12. In so far as each module 30 for absorbing energy by compression is connected to just one of the fuselage 12 and the belly fairing 28, it does not transmit any forces between the fuselage 12 and the belly fairing 28, which simplifies the design thereof.

According to an embodiment, each module 30 for absorbing energy by compression is independent of the first and second elements 32, 34 (fuselage 12 or belly fairing 28) between which it is positioned and connected to at least one of these first and second elements 32, 34 by the removable attachment system(s) 48. A removable connection means that each module 30 for absorbing energy by compression can be assembled or disassembled several times, without affecting the features of the first and second elements 32, 34. In this regard, each attachment system 48 is designed to be connected to the first or second element 32, 34 without any modification of the latter.

Figure 14:
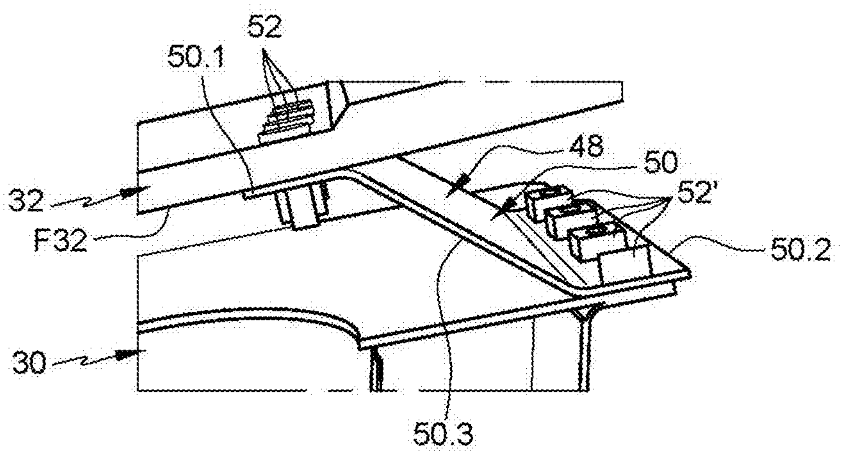
FIG. 14 is a perspective view of a connection connecting a module for absorbing energy by compression and an element of the aircraft illustrating an embodiment of the disclosure herein.
Figure 15:
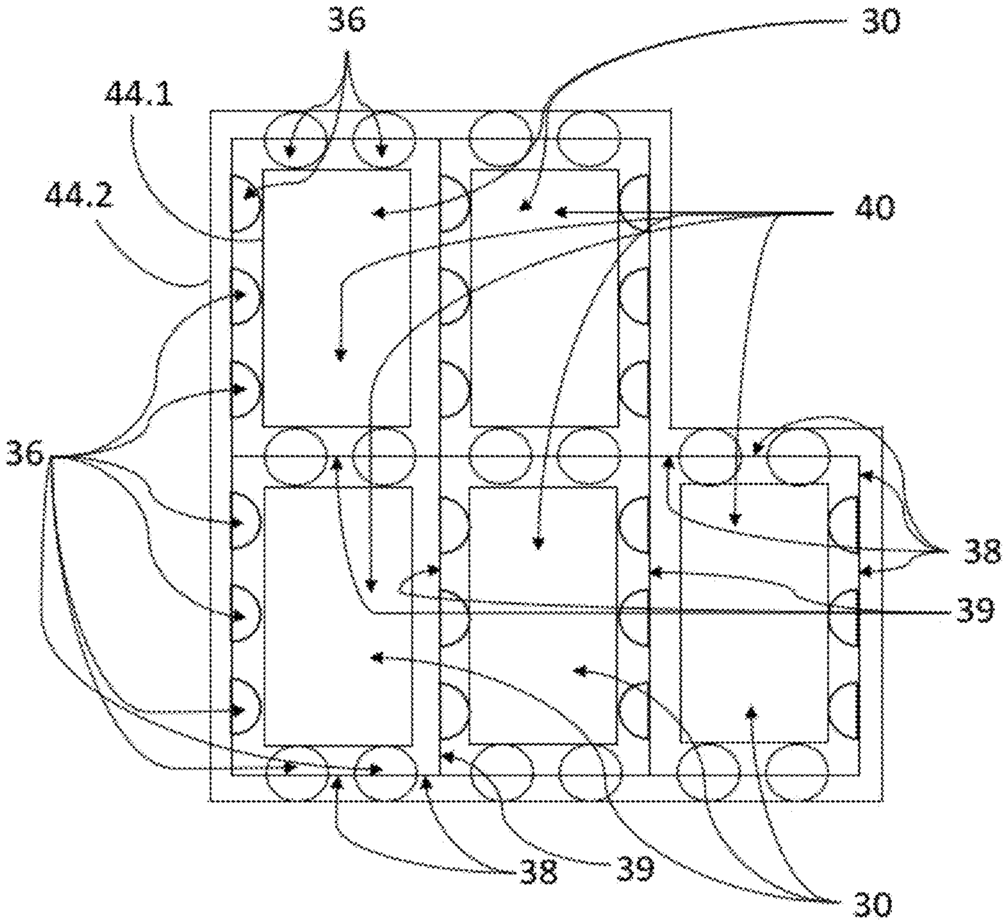
FIG. 15 is a top view of a device for absorbing energy by compression comprising five modules for absorbing energy by compression, illustrating an embodiment of the disclosure herein.
Figure 16:
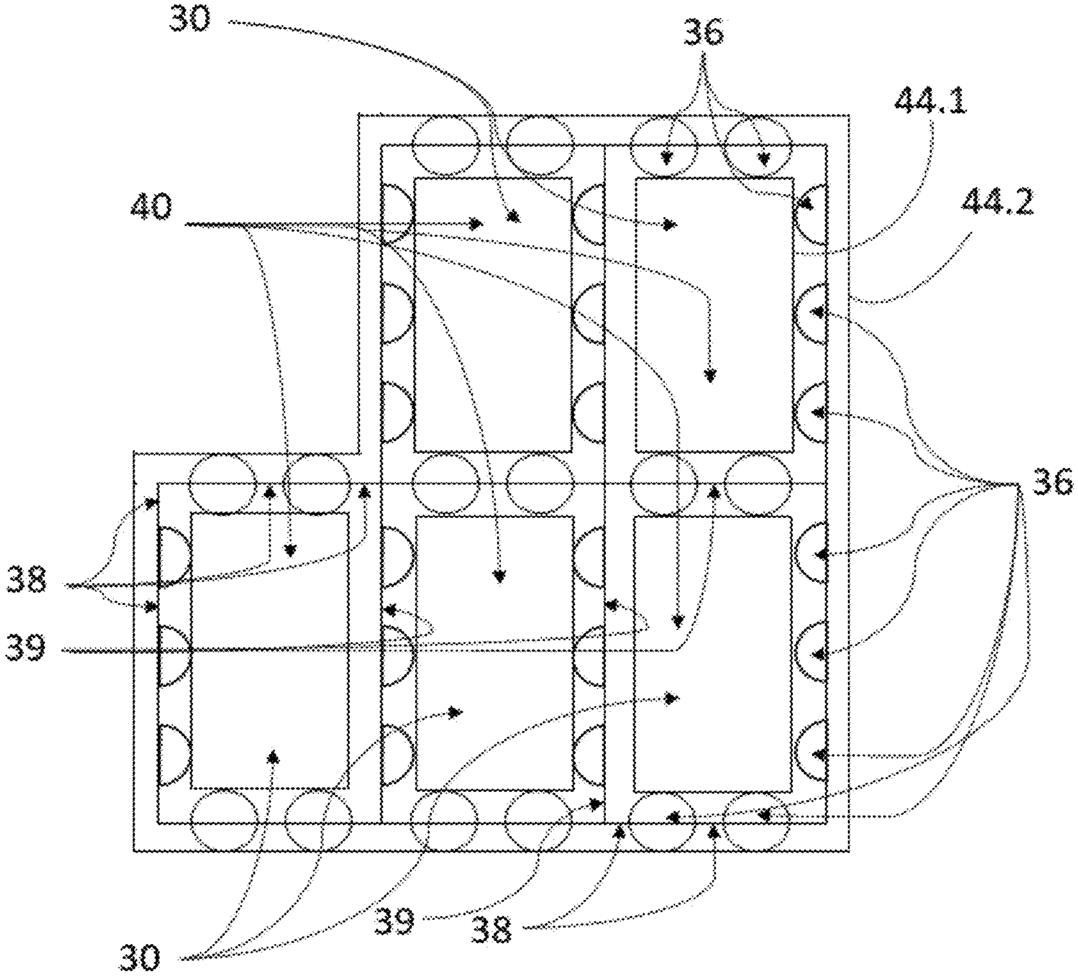
FIG. 16 is a top view of a device for absorbing energy by compression comprising five modules for absorbing energy by compression, illustrating an embodiment of the disclosure herein.
Figure 17:
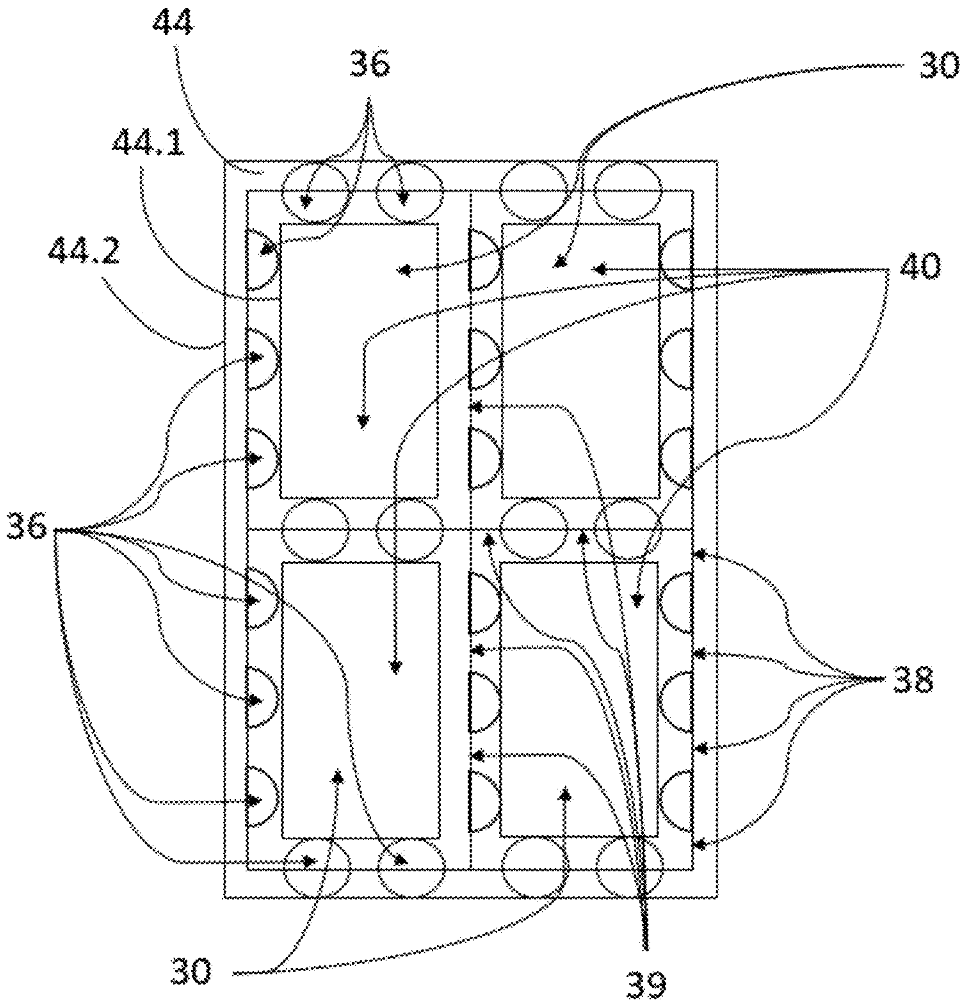
FIG. 17 is a top view of a device for absorbing energy by compression comprising four modules for absorbing energy by compression, illustrating an embodiment of the disclosure herein.
Figure 18:
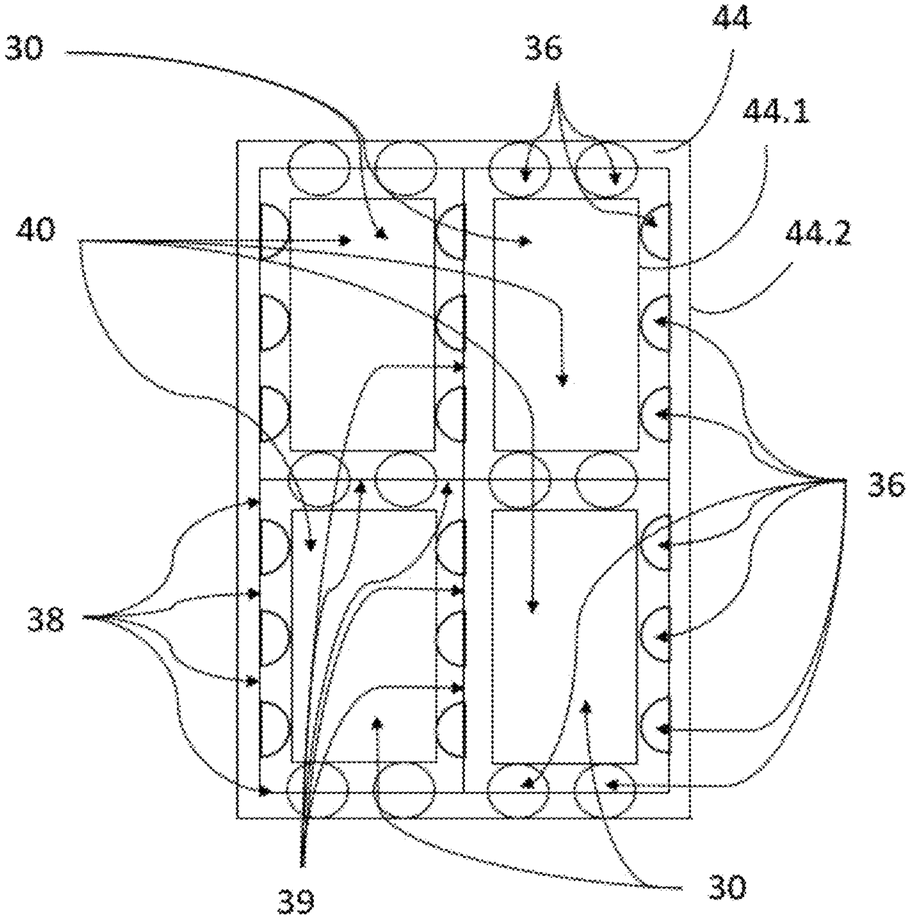
FIG. 18 is a top view of a device for absorbing energy by compression comprising four modules for absorbing energy by compression, illustrating an embodiment of the disclosure herein.

According to an arrangement visible in FIG. 13, each module 30 for absorbing energy by compression is spaced apart from the first and second elements 32, 34. According to an embodiment visible in FIG. 14, each attachment system 48 comprises a mounting angle 50 that has a first flange 50.1 pressed against the first or second element 32, 34 and connected to the latter by at least one first connection element 52, a second flange 50.2 pressed against the module 30 for absorbing energy by compression and connected to the latter by at least one second connection element 52' and a web 50.3 connecting the first and second flanges 50.1, 50.2 to form a single and unique Z-shaped part. At least one of the first and second connection elements 52, 52' is removable and is in the form of a bolt, for example. Of course, the disclosure herein is not limited to this embodiment of the attachment systems 48. Thus, the attachment systems could have a C-shaped section.

While at least one example embodiment of the invention (s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a first element;
a second element that is spaced apart from the first element; and
at least one device for absorbing energy by compression;
wherein:
the first element comprises a fuselage of the aircraft and the second element comprises a tank of the aircraft or a fairing of the aircraft; or
the first element comprises a tank of the aircraft and the second element comprises a fuselage of the aircraft, a further tank of the aircraft, or a fairing of the aircraft; or
the first element comprises a fairing of the aircraft and the second element comprises a fuselage of the aircraft, a tank of the aircraft, or a further fairing of the aircraft;
wherein the at least one device is positioned between the first and second elements and configured to be subjected to compressive forces oriented in a compression direction, the at least one device comprising one or more modules for absorbing energy by compression and one or more attachment systems that removably connects each of the one or more modules to at least one of the first element and the second element;
wherein the one or more modules each comprise:
a plurality of first conduits oriented in the compression direction; and
at least one second conduit;
wherein the one or more modules are independent of the first element and the second element; and
wherein:
each of the one or more modules is only connected to the second element; or
each of the one or more modules is spaced apart from the first element and the second element; or
each of the one or more modules is only connected to the first element.

2. The aircraft according to claim 1, wherein:
the first element is offset upwards from the second element; and
each of the one or more modules is suspended below the first element.

3. The aircraft according to claim 1, wherein each of the one or more attachment systems comprises:
a first flange that is pressed against and connected to the first element or the second element by at least one first connection element; and
a second flange that is pressed against at least one of the one or more modules and connected, by at least one second connection element and a web connecting the first flange and the second flange, to form a single and unique Z-shaped part;
wherein at least one of the first connection element and the second connection element is removable.

4. The aircraft according to claim 1, comprising:
a vertical longitudinal plane of symmetry;
wherein, for each of the one or more devices, the one or more modules are a plurality of modules that are positioned symmetrically with respect to the vertical longitudinal plane of symmetry.

5. The aircraft according to claim 1, wherein:
the one or more modules further comprise junction walls;
the plurality of first conduits are spaced apart from one another; and
the junction walls are oriented parallel to the compression direction.

6. The aircraft according to claim 1, wherein the one or more modules further comprise junction walls that are respectively oriented in two or three directions to obtain an orthogrid or isogrid network.

7. The aircraft according to claim 1, wherein the one or more modules each comprise:
at least one first end wall configured to close a first end of at least one first conduit of the plurality of first conduits; and
at least one second end wall configured to close a second end of the at least one first conduit.

8. The aircraft according to claim 1, wherein the one or more modules each comprise:
at least one first end wall configured to close a first end of at least one first conduit of the plurality of first conduits and to leave the at least one second conduit at least partially open; and
at least one second end wall configured to close a second end of the at least one first conduit and to leave the at least one second conduit at least partially open.

9. The aircraft according to claim 1, wherein each first conduit of the plurality of first conduits is defined by a side wall that laterally encloses each such first conduit and extends between first and second ends of each such first conduit.

10. The aircraft according to claim 9, wherein the one or more modules each further comprise junction walls.

11. The aircraft according to claim 10, wherein each of the junction walls extends between at least two of the plurality of first conduits.

12. The aircraft according to claim 11, wherein the at least one second conduit is defined and laterally enclosed by a subset of the junction walls.

13. An aircraft comprising:

a first element, the first element comprising a fuselage of the aircraft or a tank of the aircraft;

a second element that is spaced apart from the first element, the second element comprising a belly fairing of the aircraft; and at least one device for absorbing energy by compression;

wherein the at least one device is positioned between the first and second elements and configured to be subjected to compressive forces oriented in a compression direction, the at least one device comprising one or more modules for absorbing energy by compression and one or more attachment systems that removably connects each of the one or more modules to at least one of the first element and the second element;

wherein the one or more modules each comprise:

a plurality of first conduits oriented in the compression direction, each first conduit of the plurality of first conduits being defined by a side wall that laterally encloses each such first conduit and extends between first and second ends of each such first conduit;

junction walls, each of which extends between at least two of the plurality of first conduits; and at least one second conduit, which is defined and laterally enclosed by a subset of the junction walls;

wherein the one or more modules are independent of the first element and the second element; and wherein:

each of the one or more modules is only connected to the second element; or each of the one or more modules is spaced apart from the first element and the second element; or each of the one or more modules is only connected to the first element.

14. The aircraft according to claim 13, wherein:

the first element is offset upwards from the second element; and each of the one or more modules is suspended below the first element.

15. The aircraft according to claim 13, wherein each of the one or more attachment systems comprises:

a first flange that is pressed against and connected to the first element or the second element by at least one first connection element; and a second flange that is pressed against at least one of the one or more modules and connected, by at least one second connection element and a web connecting the first flange and the second flange, to form a single and unique Z-shaped part;

wherein at least one of the first connection element and the second connection element is removable.

16. The aircraft according to claim 13, comprising:

a vertical longitudinal plane of symmetry;

wherein, for each of the one or more devices, the one or more modules are a plurality of modules that are positioned symmetrically with respect to the vertical longitudinal plane of symmetry.

17. The aircraft according to claim 13, wherein:

the plurality of first conduits are spaced apart from one another; and the junction walls are oriented parallel to the compression direction.

18. The aircraft according to claim 13, wherein the junction walls are respectively oriented in two or three directions to obtain an orthogrid or isogrid network.

19. The aircraft according to claim 13, wherein the one or more modules each comprise:

at least one first end wall configured to close a first end of at least one first conduit of the plurality of first conduits; and at least one second end wall configured to close a second end of the at least one first conduit.

20. The aircraft according to claim 13, wherein the one or more modules each comprise:

at least one first end wall configured to close a first end of at least one first conduit of the plurality of first conduits and to leave the at least one second conduit at least partially open; and at least one second end wall configured to close a second end of the at least one first conduit and to leave the at least one second conduit at least partially open.

* * * * *